US006955598B2

United States Patent
Hagiwara et al.

(10) Patent No.: US 6,955,598 B2
(45) Date of Patent: Oct. 18, 2005

(54) DESIGNATED POSITION DETECTOR AND GAME CONTROLLER UTILIZING THE SAME

(75) Inventors: Yasuji Hagiwara, Fukushima-ken (JP); Hiroshi Nakahama, Fukushima-ken (JP); Youtaro Sakakura, Fukushima-ken (JP); Masahiro Soma, Fukushima-ken (JP)

(73) Assignee: Alps Electronics Co., Ltd., Tokyo (JP)

( * ) Notice: Subject to any disclaimer, the term of this patent is extended or adjusted under 35 U.S.C. 154(b) by 395 days.

(21) Appl. No.: 09/861,952

(22) Filed: May 21, 2001

(65) Prior Publication Data

US 2001/0046889 A1 Nov. 29, 2001

(30) Foreign Application Priority Data

May 24, 2000 (JP) ........................................ 2000-152579

(51) Int. Cl.[7] .......................... A63F 13/04; G01B 11/14
(52) U.S. Cl. ........................... 463/5; 345/158; 345/162; 356/622
(58) Field of Search ........................... 463/1, 5, 30–34, 463/36, 46–47, 51–54, 56; 345/418, 426, 589, 156, 158, 162; 356/622; 399/371; 473/222; 434/1–10

(56) References Cited

U.S. PATENT DOCUMENTS

| 4,395,045 | A | * | 7/1983 | Baer | 463/5 |
| 5,194,008 | A | * | 3/1993 | Mohan et al. | 434/22 |
| 5,310,192 | A | | 5/1994 | Miyake | |
| 5,401,025 | A | * | 3/1995 | Smith et al. | 463/5 |
| 5,795,224 | A | * | 8/1998 | Yoshida | 463/2 |
| 5,816,817 | A | * | 10/1998 | Tsang et al. | 434/22 |
| 5,926,168 | A | * | 7/1999 | Fan | 345/158 |
| 6,012,980 | A | * | 1/2000 | Yoshida et al. | 463/2 |
| 6,110,039 | A | * | 8/2000 | Oh | 463/2 |
| 6,146,278 | A | * | 11/2000 | Kobayashi | 463/53 |
| 6,171,190 | B1 | * | 1/2001 | Thanasack et al. | 463/51 |
| 6,388,656 | B1 | * | 5/2002 | Chae | 345/158 |
| 2002/0012898 | A1 | * | 1/2002 | Shechter et al. | 434/21 |

FOREIGN PATENT DOCUMENTS

JP         7-136346         5/1995

\* cited by examiner

Primary Examiner—Scott E. Jones
(74) Attorney, Agent, or Firm—Brinks Hofer Gilson & Lione

(57) ABSTRACT

A controller is provided with an artificial retina chip. The artificial retina chip is connected to a display unit via a game machine body. Before starting the game, the artificial retina chip is instructed to recognize an image of frame of the display unit to store such image as the reference image. After starting the game, the controller is moved to recognize the image of frame of the display unit in order to detect the designated position by comparing the coordinate position data after the movement and the coordinate position data of the reference image.

20 Claims, 6 Drawing Sheets

DESIGNATED POSITION DETECTOR AND GAME CONTROLLER UTILIZING THE SAME

This application claims the benefit of priority to Japanese Patent Application 2000-152579 filed on May 24, 2000.

BACKGROUND OF THE INVENTION

1. Field of the Invention

The present invention relates to a designated position detector that can designate a position on a display image through a space and a game controller for input operations, for example, of virtually shooting a target displayed on a display area using the designated position detector.

2. Description of the Related Art

A household game machine includes a shooting type game machine for shooting the target displayed on a television receiver with a model-gun type gun controller. The gun controller used in this game machine is connected to a game machine body using, for example, a predetermined cable and the game machine body is used through connection with a predetermined video terminal of the television receiver. Thereby, when a player has pulled a trigger after setting a muzzle of the gun controller to the target displayed on the display area of the television receiver, a scanning line at a surface of the display area is detected with a detecting unit of the gun controller to determine whether the target has been shot or not.

Namely, in the case where an image is displayed on the display area of CRT such as a household television receiver, the scanning line is displayed toward a right lower direction from a left upper direction in the display area of television receiver and when the scanning of one line is completed, the scanning line position is returned to a left end to start the scanning of the next line after one dot is reduced. One display image is formed with repetition of such operations as many times as the number of the scanning lines. One display image is changed over, for example, in every 1/60 second. In the game machine body, a light emitting position of the scanning line is always monitored.

A detecting unit provided in the gun controller has the directivity to detect only the light beam existing within the predetermined range in the direction of the muzzle and it is determined that the target is shot only when a player has pulled the trigger after setting the muzzle in the direction to the target and thereby the light beam of the scanning line is detected on the target.

However, the gun controller for the game machine of the related art explained above has a problem that it may be used in the CRT type television receiver in which the image is displayed by utilizing the scanning line but cannot be used, for example, in a display using a liquid crystal display unit or in a display screen using a projector in which the image is not displayed using the scanning line, and moreover it cannot be used also even in a high definition display unit for next generation in which scanning line timings are different.

SUMMARY OF THE INVENTION

The present invention is intended to solve the problems explained above and therefore it is an object of the present invention to provide a designated position detector that can detect the designated position even in any type of display unit such as a thin display unit where the images are not displayed using the scanning lines and a display unit in which the timings of the scanning lines are different, and a game controller utilizing such designated position detector.

The designated position detector of the present invention is characterized in comprising: a display unit having a display area; a detection object fixed at a location outside of the display area; and an operation member for executing the input operations to the display area via the space, wherein the operation member is also provided with: an image recognizing means for recognizing an image; and a control unit for defining, at the time of initialization, the detection object recognized with the image recognizing means as the reference image, detecting, when the operation member is moved, amount of a relative positional change between the image of detection object recognized with the image recognizing means and the reference image and obtaining the position data on the display area designated with the operation member based on such amount of change.

For instance, the detection object is set as a frame surrounding the display area in the display unit. In this case, the frame can be recognized as the detection object by detecting difference of brightness between the image of the display area recognized with the image recognizing means and the image of frame.

Alternatively, the detecting object may be set or fixed at single position or at a plurality of positions outside the display area and thereby the shape of the detecting object may be identified by recognizing the shape of the detecting object with the image recognizing means.

Otherwise, the detecting object may be set or fixed at single position or at a plurality of positions outside the display area and thereby the detecting object may be identified by recognizing difference of brightness between the detecting object and the periphery of such detecting object with the image recognizing means.

Moreover, in the case of the game controller of the present invention, contents of game are displayed on the display area and the operation member is the controller. Here, the designated position detector is used in such a manner that position is designated for the game content displayed on the display area by moving the controller while it is directed toward the display area.

In the present invention, it is possible that the external frame of the display area in which the image of the display area is not displayed is recognized with the image recognizing means and the area designated with the operation member on the display area is detected by detecting relative change of the frame or the like.

As explained above, the present invention is just suitable for a gun controller for the game machine and this controller may be used in various types of display unit, not only the display unit of related art utilizing the scanning line but also the thin display unit such as liquid crystal display unit where the scanning lines are not used for display and the high definition display unit for the next generation where the timings of scanning lines are different.

In addition, since the whole display area may be used as the display region, more powerful image can be displayed without deteriorating the feeling of the live performance.

DETAILED DESCRIPTION OF THE PREFERRED EMBODIMENT

Figure 1:
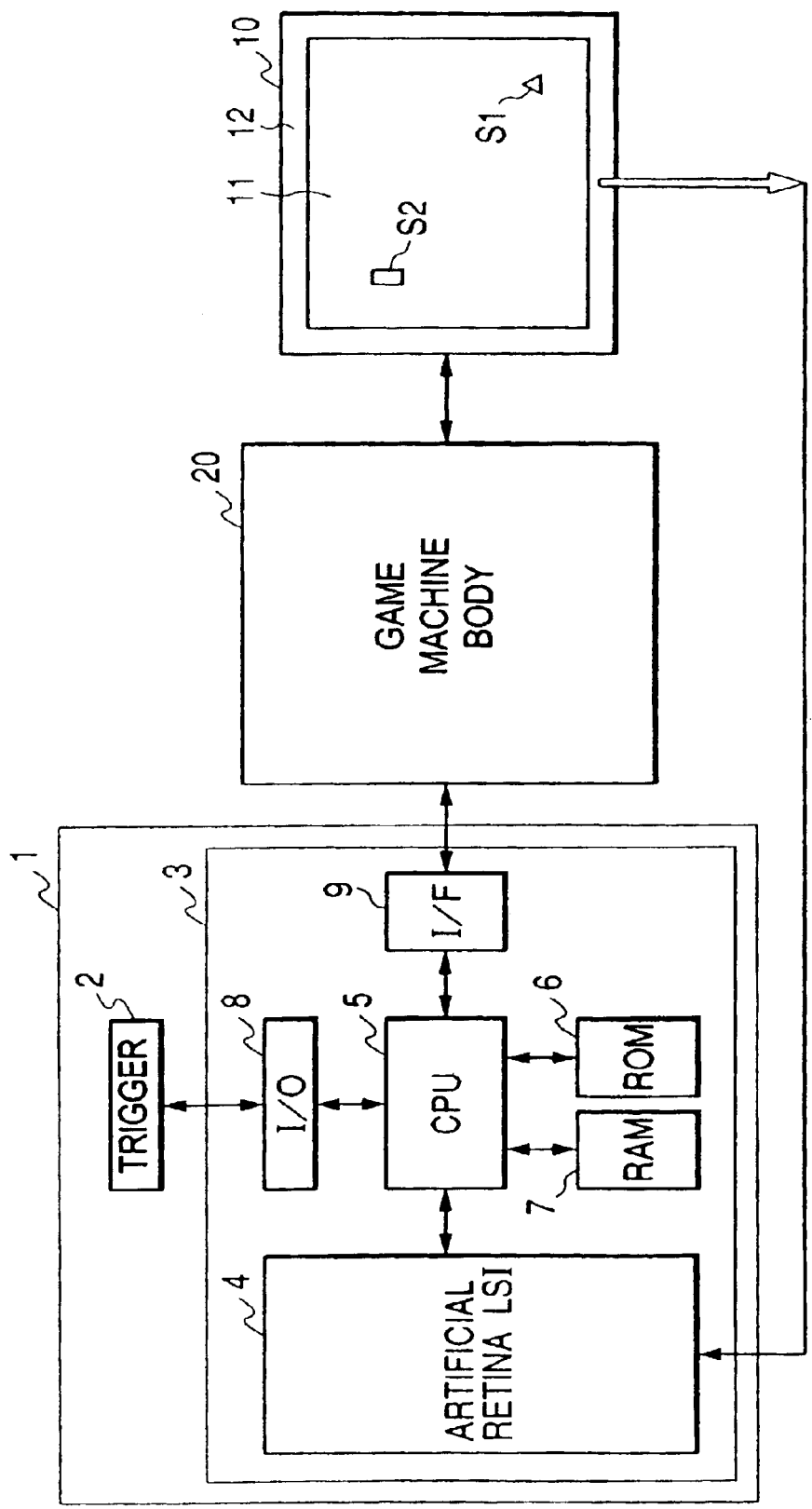
FIG. 1 is a block diagram of a system structure of a gun controller for game machine of the present invention.
Figure 2:
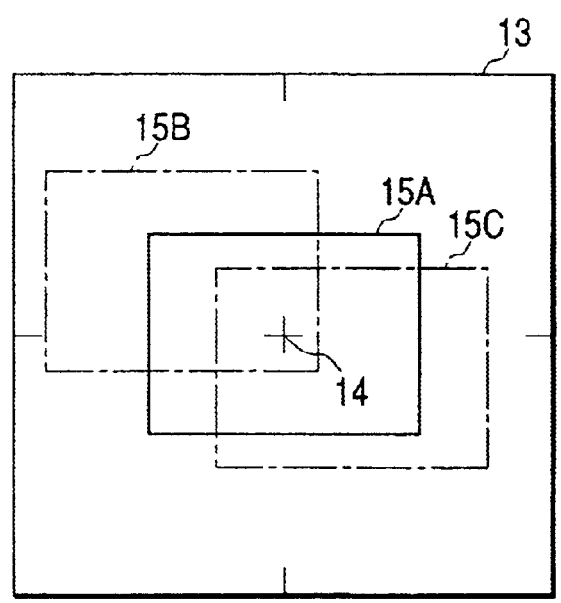
FIG. 2 is an explanatory diagram illustrating a designated position detector.
Figure 3:
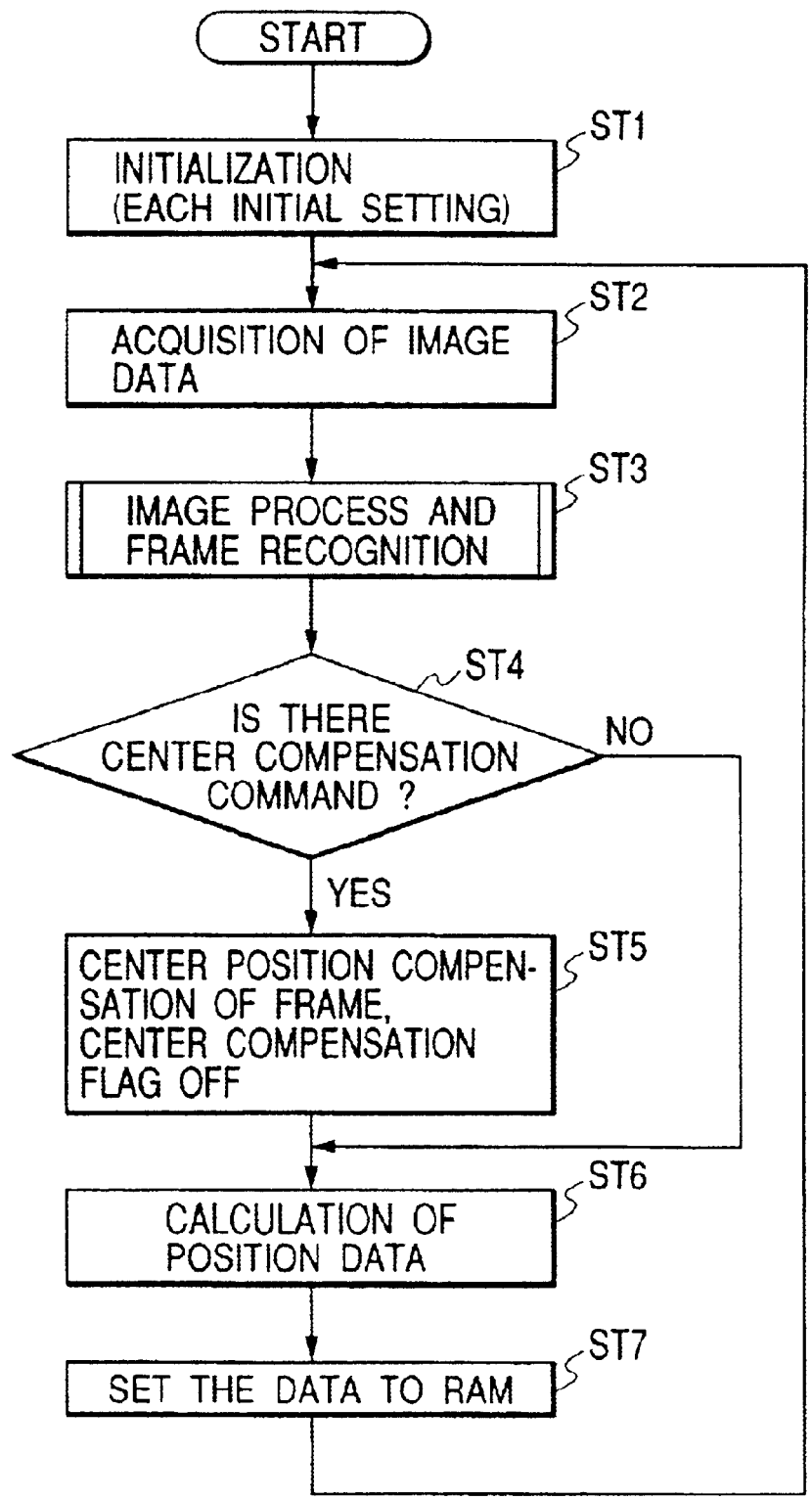
FIG. 3 is a flowchart indicating the total process of the designated position detector.
Figure 4:
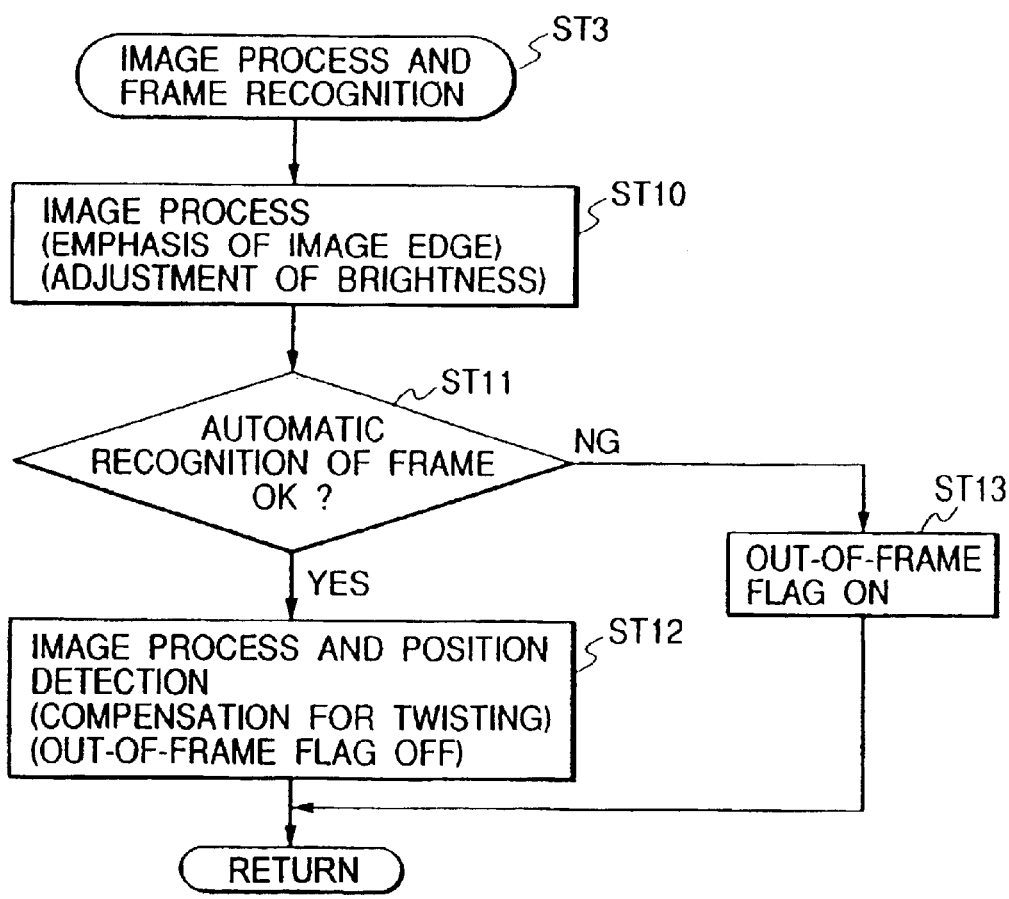
FIG. 4 is a flowchart indicating the image process and frame recognition process.
Figure 5:
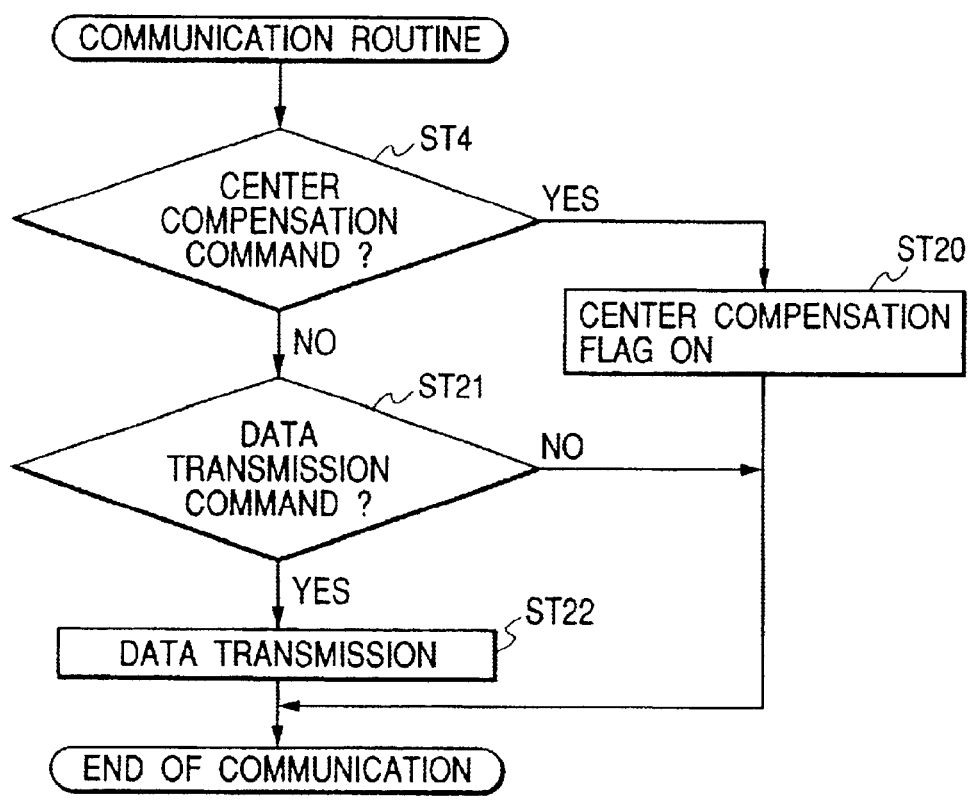
FIG. 5 is a flowchart indicating the communication process.

FIG. 1 is a block diagram illustrating a system structure of a gun controller for game machine of the present invention, FIG. 2 is an explanatory diagram of the designated position detector, FIG. 3 is a flowchart indicating the total process of the designated position detector, FIG. 4 is a flowchart indicating the image process and frame recognizing process and FIG. 5 is a flowchart indicating the communication process.

The gun controller of the present invention illustrated in FIG. 1 is comprised of a controller 1 as an operation member to be manually operated, a display unit (display) 10 utilizing a liquid crystal panel or the like and a game machine body 20. The controller 1 is connected to the game machine body 20 with a predetermined cable and the game machine 20 is connected to a video terminal or the like of the display unit 10 via the predetermined cable.

The display unit 10 may be used in multiple displays unlike the ordinary television receiver, which uses scanning lines, such as the existing display unit realizing a display with the scanning lines, a thin display unit utilizing a liquid crystal panel or a plasma display panel, a display screen utilizing a projector, and high definition television for next generation games in which timings of signals supplied to the scanning lines are different.

The controller 1 can be formed with a cabinet shaped, for example, like a model-gun that is provided with a trigger 2 and an artificial retina chip 3. With the operation of pulling the trigger 2, a predetermined signal is sent to a game machine body 20. The artificial retina chip 3 is constituted by integrating into one chip an artificial retina LSI (Large Scale Integrated Circuit) 4 as an image recognizing means, a CPU 5 functioning as a control unit, a ROM 6, a RAM 7, an input/output terminal (I/O) 8 and an interface (I/F) 9, etc.

The artificial retina LSI 4 is a chip that enables image recognition and may also discriminate and adjust the shape and brightness of an object. This artificial retina LSI 4 is provided within a barrel (not shown) of the cabinet at the position for recognizing the object from within the barrel via the muzzle (not shown). Moreover, a lens (not shown) is provided at an area near the muzzle in the cabinet and this lens recognizes the enlarged display of the object recognized with the artificial retina LSI 4.

Moreover, the artificial retina LSI 4 is connected with CPU 5 that is also connected with the ROM 6 and the RAM 7 and is further connected with the trigger 2 via the input/output terminal 8. Predetermined programs or the like for starting and image recognition are read to the CPU 5 from the ROM 6 and the image data or the like stored by the artificial retina LSI 4 is stored in the RAM 7. In addition, the CPU 5 is connected with the game machine body 20 with the predetermined interface 9.

The game machine body 20 is provided, although not illustrated in the figure, with a driver to read CDs or DVDs in which game applications, for example, are recorded or with a control unit or the like to control the images.

When the controller 1 is driven, the initial setting is performed in the artificial retina chip 3 and thereafter a user performs the initial setting. The reference numeral 13 in FIG. 2 indicates a region that can be recognized with the artificial retina chip 3, while numeral 14 is a standard indicating a center position (+) of the region 13. This standard 14 is set in matching with the position where a user views from an end point of the barrel. First, the user instructs the controller 1 to recognize the standard image and thereby the designated position is detected from the amount of change of the relative position of the image to be recognized next after the controller 1 is moved based on such reference image.

Namely, in the reference image recognizing process, an entire part of the display area 11, for example, has a brightness different from that of the frame 12 of the display area 10 and is defined as a blue image, which the user is instructed to shoot by pulling the trigger 2 by directing the muzzle to the mark X displayed at the center of the display area 11.

With the operations explained above, the frame 12 is recognized with the artificial retina chip 3 as the image indicated with the mark 15A in FIG. 2. The image 15A indicates the shape of the boundary between the frame 12 and display area 11. In this embodiment, the frame 12 surrounding the display area 11 is considered as the detection object and an image of the frame 12 as the detection object is considered as the reference image. Therefore, it is preferable for the frame 12 to have a color that contrasts with and can be easily discriminated in the brightness from the display area 11. The frame 12 preferably has the colors of, for example, black and dark green or the like.

The image data of image 15A is stored in the RAM 7 and is then used as the reference process data.

Upon start of the game, when the user pulls the trigger 2 after the muzzle of the controller 1 is directed to the target S1 of the display area 11, as illustrated in FIG. 1, for example, the muzzle is moved in the right lower direction from the reference position toward a corner of the display area 10. In this case, the image of the frame 12 of the display unit 10 recognized with the artificial retina chip 3 is conditioned as indicated with the mark 15B. Namely, the actually recognized image 15B moves in the left upper direction opposed to the direction explained above and the standard 14 indicates the area near the right lower corner of the frame 15B. The coordinate data of the reference image 15A and the image 15B after the movement are compared with each other, an amount of movement of the center to the image 15B from the image 15A is calculated with CPU 5 and the position data obtained by this calculation is sent to the game machine body 20 via the interface 9. Accordingly, when the position data is matched with or included in the coordinate data of the image of the target S1 displayed in the display area 11, the image of the target S1 is switched to the predetermined image or the point of game is added.

Moreover, when the trigger 2 is pulled while the muzzle of controller 1 is directed to the target S2 in FIG. 1, the image of frame indicated with the mark 15C in FIG. 2 is recognized. In this case, the center of the reference image 15A is located to the position outside the center of the image 15C and the amount of movement to the image 15C from the reference image 15A is calculated with CPU 5. When the calculated position data is matched with or included in the coordinate data of the target S2 displayed in the display area 11, the process or the like to give change to the image of the target S2 is performed.

As explained above, the position designated on the display area 11 with the controller 1 can be detected. When the gun controller of the present invention is of the type requiring the operation to load a bullet, it is also possible to execute the loading of bullet when the trigger 2 is pulled while the muzzle of controller 1 is directed to the outside of the display area 11.

The method of detecting the designated position with the gun controller of the present invention will then be explained below.

As illustrated in FIG. 3, in the step 1 (hereinafter, referred to as ST1), when the power of controller 1 is turned ON or when the controller 1 is connected to the game machine body 20 and the power source is supplied from the body side, various necessary initial settings are performed through the reading of the programs for starting and recognition from ROM 6. Therefore, the artificial retina LSI 4 can recognize the images. Subsequently, before starting of the game, a player performs the setting for recognition of reference image.

In the above initial settings, the image data of display area 11 and frame 12 of the display unit 10 are stored in the RAM 7 with the artificial retina chip 3 in step ST2. In this case, as explained above, after the image of display area 11 is displayed in the brightness different from that of the image of frame 12, the trigger 2 is pulled to extract the image data.

In the step ST3, as illustrated in FIG. 4, the image process is performed so that the boundary between the display area 11 and frame 12 is emphasized for the image data extracted in the step ST10, and moreover difference in the brightness between the display area 11 and frame 12 becomes more distinctive. Upon completion of image process, the processing step moves to the step ST1 to determine whether the frame 12 has an adequate size and can be automatically recognized without departing from the recognizable range or not. In the step ST11, if the frame 12 is not in the recognizable condition (NG) the out-of-frame flag indicating that the frame 12 is not in the recognizable range is turned ON and the processing step goes to the processes of step ST4 and subsequent steps. Moreover, when the frame is in the recognizable condition (YES) in the step ST11, the processing step moves to the step ST12 to perform the image process for twisting and distortion in order to detect the coordinate position data of the frame 12. When the image processing and position detection are completed, the out-of-frame flag indicating that the frame 12 is outside the recognizable range is turned OFF and the processing step goes to the processes of the step ST4 and subsequent steps.

In the step ST4, whether the signal to compensate the center position is generated or not is detected. Namely, the image data is not always extracted at the center of the frame 12 when the trigger 2 is pulled and the image data is sometimes extracted at the position deviated from the center. Therefore, when the compensation signal to compensate the center is outputted in the step ST4 (YES), the processing step moves to the step ST5 to compensate the center position of the frame 12.

When the center compensation signal is outputted in the step ST4 (YES), the processing step moves to the step ST20 indicating the communication process of FIG. 5 and the flag indicating that the center position at the predetermined position on the data format is turned ON.

In the case where the frame 12 is recognized as explained above, the artificial retina chip 3 is recognized in various patterns depending on the direction and inclination of the controller 1. Therefore, when the compensation of center position of the frame 12 is completed in the step ST5, the flag for compensating the center position is turned OFF.

In the step ST6, the coordinate position data of the frame 12 is calculated. Moreover, after moving to the step ST7, the coordinate position data is stored in the RAM 7 and this coordinate position data is used in the subsequent processes as the reference image.

Moreover, in the designated position detection process during the game in place of the setting to store the reference image before the start of the game, the processes of the steps ST2 to ST7 are repeated so long as the power source is not turned OFF or the display unit is not switched to the other display unit.

Namely, the processes similar to that explained above are executed in the steps ST2 and ST3 and thereafter the processing step moves to the step ST4. In the step ST4, whether the command to compensate the center position is outputted or not is determined, but the processing step goes to the step ST6 because it is not the setting to recognize the reference image. In this step ST6, the coordinate position data of the image recognized after the movement is compared with the coordinate position data of the reference image in CPU 5 and thereby the amount of movement (amount of change) is calculated. After moving to the step ST7, the calculated value is stored in the RAM 7. When it is recognized that the calculated value is matched with or included to the coordinate position data displaying the target of the display unit 10, the image explained above is reflected on the image displayed when the target is shot.

Here, since the center position compensation command is not outputted (NO) in the step ST4 as illustrated in FIG. 5, the processing step moves to the step ST21. In the step ST21, whether the data transmission command to transmit the recognized image data is outputted or not is determined. When the data transmission command is not outputted (NO), the communication process is completed and the processes of the step ST6 and the subsequent steps are executed. Moreover, when the data transmission command is received (YES) in the step ST21, the predetermined image process explained above is processed in the step ST22 and thereby the image data of the frame 12 obtained from frame recognition is transmitted and thereby the processes of the step ST6 and subsequent steps are also executed.

As explained above, the position on the display area 11 designated with the controller 1 can be recognized by calculating displacement between the center position of the display area 11 obtained by recognizing the frame 12 surrounding the display area 11 in the display unit 10 and the center position of the frame 12 recognized after the movement.

Figure 6:
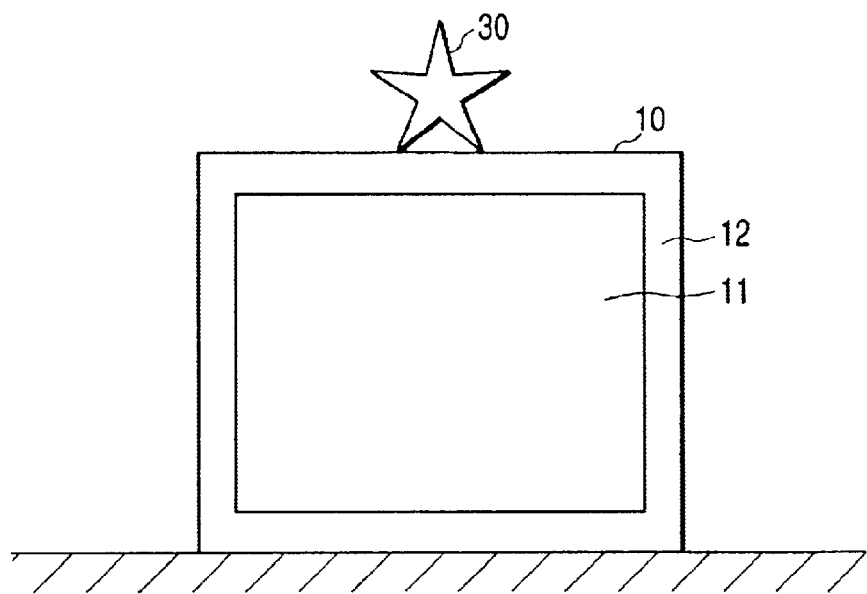
FIG. 6 is an explanatory diagram illustrating the other designated position detector.

FIG. 6 is an explanatory diagram indicating the other designated position detector with the gun controller for the game machine of the present invention.

The detector illustrated in FIG. 6 does not recognize a frame 12 of the display unit 10 such as the liquid crystal display as the detection object but uses the identification member 30 of the desired shape installed or fixed in the external side of the frame 12 as the detection object.

This identification member 30 is recognized with the controller 1 at the time of initial setting before start of the game. The number of identification member 30 is not limited to only one and it is also possible that two or more identification members are provided and identified. In this case, the detection object may be identified by recognizing the shape of the identification member 30 or it is also possible that a self-light-emitting radiating member or reflecting member is used as the identification member and the identification member 30 is identified as the detection object from the difference of brightness between the identification member 30 and peripheral part.

The present invention explained above can effectively used as the gun controller for the game machine and moreover can detect the designated position even in any type of display unit using different display means that is not limited to that realizing the display of image using the scanning lines, for example, the display unit in which images are displayed without use of the scanning lines and the display unit using a liquid crystal panel, projector or that using different timings of the scanning lines.

What is claimed is:

1. A designated position detector comprising:
   a display unit having a display area;
   a detection object fixed and located outside the display area; and
   an operation member to execute input operations to the display area via space,
   wherein the operation member is provided with:
      an image recognizing mechanism to recognize images; and
      a control unit to define the detection object recognized with the image recognizing mechanism at a time of initial setting as a reference image, detecting a relative positional displacement between an image of the detection object recognized with the image recognizing mechanism when the operation member is moved and the reference image, and thereby obtaining a position data on the display area designated with the operation member based on such displacement, and
   the detection object is a frame surrounding the display area in the display unit.

2. A designated position detector according to claim 1, wherein the frame is recognized as the detection object by detecting a difference in the brightness of the image of the display area recognized with the image recognizing mechanism and the image of the frame.

3. A designated position detector according to claim 1, wherein the detection object is provided in a single position outside the display area and the detection object is identified by recognizing difference in a brightness between the detection object and a peripheral part thereof with the image recognition mechanism.

4. A designated position detector according to claim 1, wherein the detection object is at least one object provided in a position outside the display area and the at least one object is identified by recognizing a difference in a brightness between the at least one object and a peripheral part thereof with the image recognition mechanism.

5. A designated position detector according to claim 1, wherein the detection object is at least one object fixed in a position outside the display area and the at least one object is identified by recognizing a difference in a brightness between the at least one object and a peripheral part thereof with the image recognition mechanism.

6. A designated position detector comprising:
   a display unit having a display area;
   a detection object fixed and located outside the display area; and
   an operation member to execute input operations to the display area via space,
   wherein the operation member is provided with:
      a image recognizing mechanism to recognize images; and
      a control unit to define the detection object recognized with the image recognizing mechanism at a time of initial setting as a reference image, detecting a relative positional displacement between an image of the detection object recognized with the image recognizing mechanism when the operation member is moved and the reference image, and thereby obtaining a position data on the display area designated with the operation member based on such displacement, and
   the detection object is provided in a single position outside the display area and the detection object is identified by recognizing a shape of the detection object with the image recognizing mechanism.

7. A controller for a game machine comprising:
   a designated position detector that includes:
      a display unit having a display area;
      a detection object fixed and located outside the display area; and
      an operation member to execute input operations to the display area via space, the operation member provided with: an image recognizing mechanism to recognize images and a control unit to define the detection object recognized with the image recognizing mechanism at a time of initial setting as a reference image, detecting a relative positional displacement between an image of the detection object recognized with the image recognizing mechanism when the operation member is moved and the reference image, and thereby obtaining a position data on the display area designated with the operation member based on such displacement,
   wherein the detection object is a frame surrounding the display area in the display unit, and
   game contents are displayed on the display area, the operation member is a controller and positions for the game contents displayed on the display area are designated by moving the controller while the controller is directed toward the display area.

8. A controller for the game machine according to claim 7, wherein the detection object is a frame surrounding the display area in the display unit.

9. A controller for the game machine according to claim 8, wherein, in the designated position detector, the frame is recognized as the detection object by detecting difference in a brightness between an image of the display area recognized with the image recognizing mechanism and the image of the frame.

10. A controller for the game machine according to claim 7, wherein, in the designated position detector, the detection object is provided in single position outside the display area and the detection object is identified by recognizing a shape of the detection object.

11. A controller for the game machine according to claim 7, wherein, in the designated position detector, the detection object is provided in a single position outside the display area and the detection object is identified by recognizing a difference in a brightness between the detection object and a periphery thereof with the image recognizing mechanism.

12. A controller for the game machine according to claim 7, wherein, in the designated position detector, the detection object is fixed in single position outside the display area and the detection object is identified by recognizing a shape of the detection object.

13. A controller for the game machine according to claim 7, wherein, in the designated position detector, the detection object is at least one object provided in a position outside the display area and the object is identified by recognizing a shape of the object.

14. A controller for the game machine according to claim 7, wherein, in the designated position detector, the detection object is at least one object fixed in a position outside the display area and the object is identified by recognizing a shape of the object.

15. A controller for the game machine according to claim 7, wherein, in the designated position detector, the detection object is fixed in a single position outside the display area and the detection object is identified by recognizing a difference in a brightness between the detection object and a periphery thereof with the image recognizing mechanism.

16. A controller for the game machine according to claim 7, wherein, in the designated position detector, the detection object is at least one object provided in a position outside the display area and the object is identified by recognizing a difference in a brightness between the object and a periphery thereof with the image recognizing mechanism.

17. A controller for the game machine according to claim 7, wherein, in the designated position detector, the detection object is at least one object fixed in a position outside the display area and the object is identified by recognizing a difference in a brightness between the object and a periphery thereof with the image recognizing mechanism.

18. A designated position detector comprising:
a display unit having a display area;
a detection object fixed and located outside the display area; and
an operation member to execute input operations to the display area via space,
wherein the operation member is provided with:
an image recognizing mechanism to recognize images; and
a control unit to define the detection object recognized with the image recognizing mechanism at a time of initial selling as a reference image, detecting a relative positional displacement between an image of the detection object recognized with the image recognizing mechanism when the operation member is moved and the reference image, and thereby obtaining a position data on the display area designated with the operation member based on such displacement, and
the detection object is fixed in single position outside the display area and the detection object is identified by recognizing a shape of the detection object with the image recognizing mechanism.

19. A designated position detector comprising:
a display unit having a display area;
a detection object fixed and located outside the display area; and
an operation member to execute input operations to the display area via space,
wherein the operation member is provided with:
an image recognizing mechanism to recognize images; and
a control unit to define the detection object recognized with the image recognizing mechanism at a time of initial setting as a reference image, detecting a relative positional displacement between an image of the detection object recognized with the image recognizing mechanism when the operation member is moved and the reference image, and thereby obtaining a position data on the display area designated with the operation member based on such displacement, and
the detection object is at least one object provided in a position outside the display area and the at least one object is identified by recognizing a shape of the at least one object with the image recognizing mechanism.

20. A designated position detector comprising:
a display unit having a display area;
a detection object fixed and located outside the display area; and
an operation member to execute input operations to the display area via space,
wherein the operation member is provided with:
an image recognizing mechanism to recognize images; and
a control unit to define the detection object recognized with the image recognizing mechanism at a time of initial setting as a reference image, detecting a relative positional displacement between an image of the detection object recognized with the image recognizing mechanism when the operation member is moved and the reference image, and thereby obtaining a position data on the display area designated with the operation member based on such displacement, and
the detection object is at least one object fixed in a position outside the display area and the detection objects are identified by recognizing a shape of the at least one object with the image recognizing mechanism.

* * * * *

UNITED STATES PATENT AND TRADEMARK OFFICE
CERTIFICATE OF CORRECTION

PATENT NO. : 6,955,598 B2  Page 1 of 1
APPLICATION NO. : 09/861952
DATED : October 18, 2005
INVENTOR(S) : Yasuji Hagiwara et al.

It is certified that error appears in the above-identified patent and that said Letters Patent is hereby corrected as shown below:

Column 7, in claim 3, line 4, after "by recognizing" insert --a--.

Column 8, in claim 9, line 5, after "mechanism and" delete "the" and substitute --an-- in its place.

Column 9, in claim 18, line 12, before "as a reference" delete "selling" and substitute --setting-- in its place.

Signed and Sealed this

Seventeenth Day of October, 2006

JON W. DUDAS
*Director of the United States Patent and Trademark Office*